Patented Nov. 2, 1948

2,453,071

UNITED STATES PATENT OFFICE 2,453,071

DESENSITIZATION OF SOLID ORGANIC PEROXIDES

Harlow G. Hyatt, Buffalo, and Edward S. Shanley, Kenmore, N. Y., assignors to Buffalo Electro-Chemical Company, Inc., Tonawanda, N. Y.

No Drawing. Application January 27, 1945, Serial No. 574,971

8 Claims. (Cl. 260—610)

The present invention detals with an improved method for desensitizing normally solid organic peroxides and, in particular, with the desensitization and reduction in impact sensitivity of those solid organic peroxides which are normally explosive.

In our co-pending application, Serial No. 550,846 filed August 23, 1944, is disclosed the use of various organic acids for the desensitization of organic peroxides, and the advantage of these compounds over the inorganic extenders, etc., discussed in the prior art. Further investigation has now shown that many additional substances can be used to accomplish the desired reduction in sensitivity, provided that the proper method of applying the desensitizer to the solid organic peroxide is employed.

It has been discovered, in accordance with the present invention, that inert materials in general can be used for this purpose if they can be precipitated from solution in finely divided form upon the finely divided solid peroxide. In the preferred method of desensitizing, the solid peroxide, in a very finely divided condition, is stirred in an excess of water containing the desired desensitizer, or a constituent thereof, in true solution. This slurry is then treated so as to cause precipitation of the inert desensitizing material from solution. This may be accomplished in any suitable fashion, for instance by adding the remaining constituent of the desensitizer, by changing the pH, etc. At any rate, the materials must be so chosen, and the reaction so managed, that the solid phase, the organic peroxide, remains virtually unchanged in appearance; presumably this indicates the precipitation of the desensitizer upon the particles of peroxide in the slurry. The intimately mixed solids may then be filtered off and dried in any conventional way.

The following examples are intended to illustrate the practice of the present invention:

*Example I.—Desensitizing with calcium sulfate*

Twenty grams of finely divided benzoyl peroxide was suspended in 200 ml. of water containing 0.8 g. of calcium chloride. This slurry was treated with 100 ml. of an aqueous solution containing 1 g. of sulfuric acid. After stirring for a few minutes, the solds were filtered off and dried in a current of warm air. The peroxide, unchanged in appearance, was found to contain about 5% of calcium sulfate.

Impact sensitivity tests were made in a Bureau of Mines type impact tester. The peroxide of this example proved to have a probability of ignition of 0.5 at 80 kg. cm. impact.

A similar sample of dry, finely powdered benzoyl peroxide was tumbled in a ball mill for 2 hours with 5% of dry anhydrous, very finely powdered calcium sulfate. This sample of peroxide, also diluted with 5% of calcium sulfate, was found to have a probability of ignition of 1.0 at 80 kg cm., which is the same as the figure for pure benzoyl peroxide. Thus, 5% calcium sulfate is found to reduce the probability of ignition by ½ when precipitated, and to have virtually no effect when mechanically mixed.

*Example II.—Desensitizing with lauric acid*

Twenty grams of powdered benzoyl peroxide was slurried with 200 ml. of water containing 1.1 grams of lauric acid. This solution was treated with a small amount of acetic acid, until the solution reacted acid to litmus. After stirring for a short time, the solids were filtered off and dried. The dry peroxide mixture, which was found to contain 5% of fatty acids, was tested in the impact machine. It proved to have a probability of ignition of 0.1 at 120 kg. cm. Similar results are obtained by precipitating fatty acids from soap solutions by means of acid.

A similar sample of powdered benzoyl peroxide was tumbled in a ball mill for 2 hours with 10% of lauric acid, fine powder. The resulting mixture had a probability of ignition of 0.6 at 90 kg. cm. Thus, lauric acid at 10% concentration only slightly affects the sensitivity of benzoyl peroxide, when it is mixed mechanically, whereas 5% lauric acid, when precipitated on the peroxide, results in a great reduction in sensitivity.

*Example III.—Desensitizing with aluminum hydroxide*

Twenty grams of benzoyl peroxide was suspended in 200 ml. of water containing 6.5 g. aluminum sulfate, hydrated. To this slurry ammonia was added until the pH reached 6, when the aluminum is quantitatively precipitated as the hydrate. The slurry was filtered and the solids were then dried in a current of warm air.

In an exactly parallel experiment, the same quantity of aluminum sulfate in the same quantity of water only, was precipitated with ammonia. This aluminum hydrate was filtered off and dried in a warm air current, parallel to the sample containing the benzoyl peroxide. This alumina, upon becoming dry, was powdered in a mortar and then mechanically mixed with 20 g. of dry powdered benzoyl peroxide.

Impact tests on these samples showed a probability of ignition of 0.0 at 100 kg. cm. for the peroxide carrying the precipitated alumina, while the peroxide mechanically mixed with the same quantity of alumina showed a sensitivity of 0.8 at 80 km. cm., virtually the same as undiluted benzoyl peroxide.

*Example IV.—Desensitizing with phthalic acid*

Twenty grams of benzoyl peroxide was stirred into 200 ml. of water containing 1.3 g. sodium phthalate. To this solution was added dilute sulfuric acid until the pH dropped to about 2. The peroxide carrying the precipitated phthalic acid was filtered off and dried in warm air. The dried material proved to have a probability of ignition of 0.3 at 80 kg. cm.

A 20 g. sample of powdered benzoyl peroxide was tumbled for two hours in a ball mill with 2 g. of powdered phthalic acid. The resulting mechanical mixture was found to have a probability of ignition of 0.7 at 80 kg. cm., when tested in the Bureau of Mines type impact machine. Thus, mechanically mixed phthalic acid is shown to be much less effective than precipitated phthalic acid, even when the former is used at twice the concentration.

The foregoing examples are illustrative of the invention as any of the sensitizers are operative provided the desensitizer is precipitated from solution in finely divided form upon the finely divided solid organic peroxide. Although the most widely employed methods of precipitation will be by means of chemical reaction by double decomposition and by decreasing the solubility of the desensitizer in a solvent, it will be understood that any means of precipitating the desensitizer is comprehended within the scope of the invention.

What is claimed is:

1. The method of reducing the impact sensitivity of a solid organic peroxide with calcium sulfate desensitizer which comprises suspending the peroxide in a solution of a soluble calcium salt and adding thereto a soluble sulfate to form insoluble calcium sulfate which mingles with and coats the peroxide, the amount of desensitizer being very substantially less than that required to effect a like desensitizing action when milled with the peroxide.

2. The method of reducing the impact sensitivity of a solid organic peroxide with calcium sulfate desensitizer which comprises suspending the peroxide in a solution of a soluble calcium salt and adding thereto a soluble sulfate to form insoluble calcium sulfate which mingles with and coats the peroxide and thereafter collecting and drying the solid, the amount of desensitizer being very substantially less than that required to effect a like desensitizing action when milled with the peroxide.

3. The method of reducing the impact sensitivity of an organic peroxide with lauric acid which comprises suspending the peroxide in a solution having a lauric acid compound dissolved therein and then precipitating lauric acid upon the peroxide and thereafter removing the so treated peroxide and drying the same.

4. The method of reducing the impact sensitivity of an organic peroxide with phthalic acid which comprises suspending the peroxide in a solution having a phthalic acid compound dissolved therein and then precipitating phthalic acid upon the peroxide and thereafter removing the so treated peroxide and drying the same.

5. The method of reducing the impact sensitivity of an organic peroxide with an insoluble organic acid which comprises suspending the peroxide in a solution containing a soluble salt of the organic acid dissolved therein and then precipitating the organic acid upon the peroxide and thereafter removing the so treated peroxide and drying the same.

6. The method of reducing the impact sensitivity of an organic peroxide with an insoluble organic acid which comprises suspending the peroxide in a solution containing a soluble salt of the organic acid dissolved therein and then decreasing the pH of the solution until the organic acid is precipitated upon the peroxide and thereafter removing the so treated peroxide and drying the same.

7. The method of reducing the impact sensitivity of a solid organic peroxide which comprises precipitating from solution upon the finely divided peroxide a material known to desensitize solid organic peroxides when milled therewith, and thereafter removing the so treated peroxide and drying the same.

8. The method of reducing the impact sensitivity of a solid organic peroxide which comprises suspending the peroxide in a solution of a water soluble compound capable of reacting by double decomposition to form an insoluble material known to desensitize solid organic peroxides when milled therewith, then by double decomposition precipitating the desensitizer upon the finely divided peroxide and thereafter removing the so treated peroxide and drying the same.

HARLOW G. HYATT.
EDWARD S. SHANLEY.

REFERENCES CITED

The following references are of record in the file of this patent:

UNITED STATES PATENTS

| Number | Name | Date |
|---|---|---|
| 1,000,298 | Sarason | Aug. 8, 1911 |
| 1,754,914 | Stoddard | Apr. 15, 1930 |
| 1,846,185 | Cline | Feb. 23, 1932 |
| 2,132,588 | Straup | Oct. 11, 1938 |
| 2,188,247 | Penn | Jan. 23, 1940 |
| 2,222,830 | Moss | Nov. 26, 1940 |
| 2,335,856 | Hooft | Dec. 7, 1943 |